Figures 1, 2:
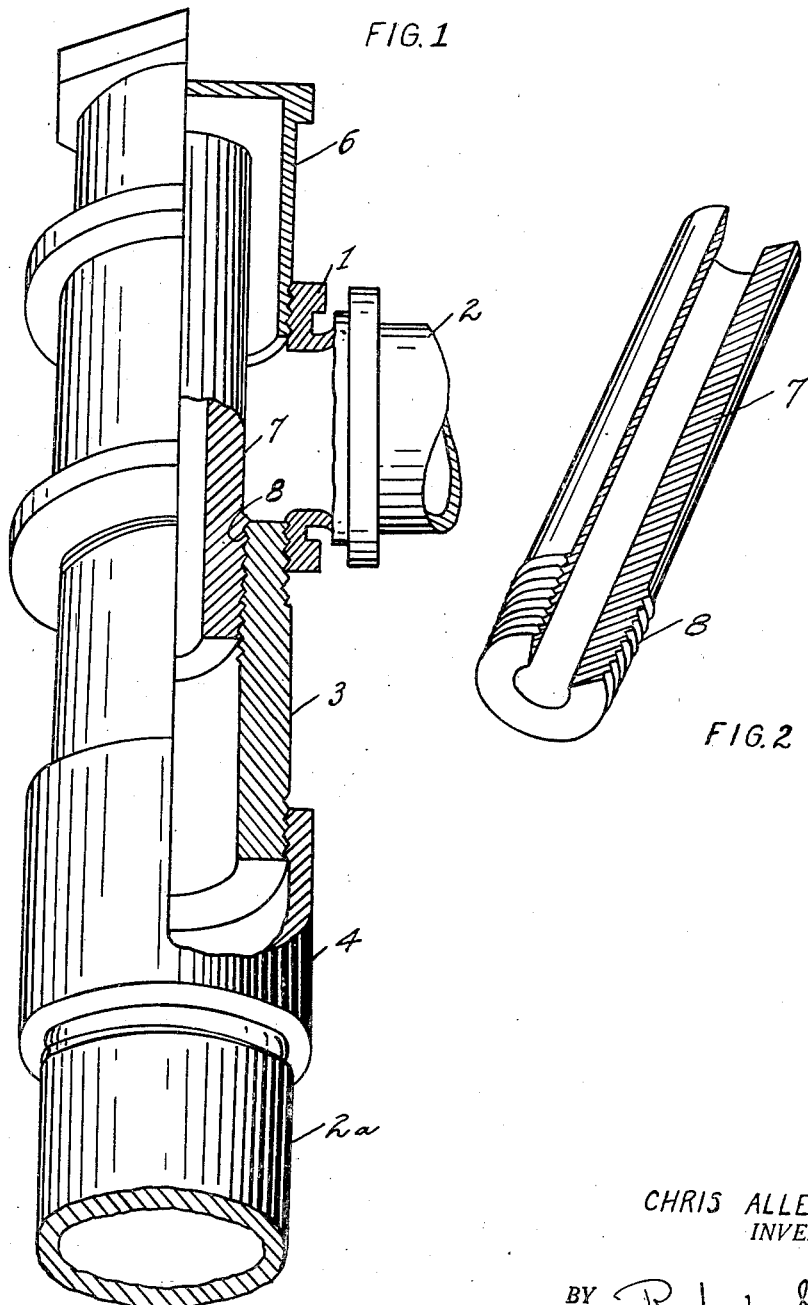

Feb. 17, 1925.

C. ALLEN

FLOW NIPPLE

Filed Jan. 3, 1922

1,526,655

CHRIS ALLEN
    INVENTOR.

BY R. W. Smith
        ATTORNEY.

Patented Feb. 17, 1925.

1,526,655

UNITED STATES PATENT OFFICE.

CHRIS ALLEN, OF HUNTINGTON BEACH, CALIFORNIA.

FLOW NIPPLE.

Application filed January 3, 1922. Serial No. 526,533.

*To all whom it may concern:*

Be it known that I, CHRIS ALLEN, a citizen of the United States, residing at Huntington Beach, in the county of Orange, State of California, have invented new and useful Improvements in Flow Nipples, of which the following is a specification.

This invention is an improvement in the type of flow nipple set forth in my United States Patent No. 1,404,724, of Jan. 31, 1922, and it is the object of the invention to provide a flow nipple which may be quickly and readily removed and replaced when it has become worn. The construction contemplates an arrangement whereby a single operation may effect the replacement of the flow nipple, without necessitating disconnection of the pipe line in which the nipple is employed.

More particularly, the construction comprises a housing inserted in the pipe line, and having a flow inlet and a flow outlet, and also provided with a replacement aperture, through which the flow nipple may be inserted and removed. When in position, the nipple is detachably connected to said housing.

It is a further object of the invention to reduce to a minimum the cost of the nipple proper, by making possible the employment of a straight axially bored member, requiring no further machining other than the threading of one end of the same.

In the specific embodiment of the invention illustrated, these objects are accomplished by using a housing comprising a T-joint, with the lateral opening and one of the axial openings utilized as an inlet and an outlet, and the other axial opening providing a replacement opening for the reducing nipple. The nipple when inserted in position through the replacement opening, is threaded into the axial flow opening of the housing, and the replacement opening is then provided with suitable closure means. The parts are so arranged as to form an annular space between the reducing nipple and the housing, and a free passage between the lateral flow opening of the housing and the rear end of the bore of the nipple. By this construction, the necessity of forming additional ports in the reducing nipple is eliminated.

The invention will be readily understood from the following description of the accompanying drawing in which, Fig. 1 is a perspective view, partly in section, of the assembled construction.

Fig. 2 is a similar view of the reducing nipple.

In practice a T-joint 1 is inserted in the pipe line where the flow nipple is to be employed, the pipe section 2 of the line being threaded in usual manner into the lateral opening of the joint, and the pipe section 2ª being connected to one of the axial openings of the T-joint, as by means of the external nipple 3 having threaded connection with the T-joint, and in turn connected to section 2ª of the pipe line by coupling 4.

The other axial opening of the T-joint forms a replacement opening for the reducing nipple, and when the latter is in position, may be closed by a bolt plug 6 having threaded connection with the T-joint.

The reducing nipple is a straight axially bored member 7, externally threaded at its forward portion as shown at 8, in order to engage corresponding internal threads upon the nipple 3. By this arrangement, the reducing nipple may be readily mounted in position, through the replacement opening of the T-joint, and may be as quickly removed, when worn.

The parts are so arranged that the rear portion of the reducing nipple, which is positioned within plug 6, is spaced an appreciable distance from the walls of the housing formed by the plug and the T-joint, and the rear end of the reducing nipple is similarly spaced from the end of plug 6.

As a consequence, an unobstructed passage is formed between the lateral flow opening of the T-joint, and the rear end of the bore of the reducing nipple, while at the same time the axial flow opening of the T-joint is closed by the forward end of the reducing nipple.

It will thus be seen that the entire flow through the pipe line must pass through the reducing nipple. It will further be noted that the arrangement set forth, provides for the use of an inexpensive and therefore economically replaceable reducing nipple, since the latter is simply an axially bored member threaded at its forward portion.

The provision of the replacement opening with its closure means at the rear axial opening of the T-joint also permits of the ready replacement of the reducing nipple, without disconnecting the pipe line.

While I have illustrated and described the preferred embodiment of my device, it will be apparent that various changes may be made in the construction, combination, and arrangement of parts, without departing from the spirit of the invention.

What is claimed is:

1. A device of the character described comprising a housing having a flow inlet passageway, a flow outlet, and a replacement aperture; and a reducing nipple in said housing removable through said replacement aperture, said reducing nipple having a straight bore open at each end, and said inlet passageway being of appreciable length and adapted for unobstructed flow through the same into said nipple.

2. A device of the character described comprising a housing adapted to receive a reducing nipple, said housing having a flow inlet passageway, a flow outlet and a replacement aperture for withdrawal and insertion of said reducing nipple, said inlet passageway being of an appreciable length and adapted for unobstructed flow through the same into said nipple.

3. A device of the character described comprising a housing having a flow inlet passageway, a flow outlet, and a replacement aperture; and a reducing nipple in said housing removable through said replacement aperture and having one end communicating with said outlet opening and the other end open to said inlet passageway, and said inlet passageway being of appreciable length and adapted for unobstructed flow through the same into said nipple.

4. A device of the character described comprising a housing adapted to receive a reducing nipple and having aligned openings and an inlet passageway laterally disposed with relation to said aligned openings, one of said aligned openings forming a replacement opening for withdrawal and insertion of said reducing nipple, and said inlet passageway being of appreciable length and adapted for unobstructed flow through the same into said nipple.

5. A device of the character described comprising a housing having a flow inlet passageway, a flow outlet, and a replacement aperture; closure means for said replacement aperture; and a reducing nipple in said housing removable through said replacement aperture and having one end communicating with said outlet opening and the other end open to said inlet passageway and spaced from said closure means, and said inlet passageway being of appreciable length and adapted for unobstructed flow through the same into said nipple.

6. A device of the character described comprising a housing having aligned openings and an inlet passageway laterally disposed with relation to said aligned openings, one of said aligned openings forming a replacement aperture, closure means for said replacement aperture, the other of said aligned openings forming an outlet, and a reducing nipple in said housing removable through said replacement aperture and having one end communicating with said outlet and the other end open to said inlet passageway and spaced from said closure means, said inlet passageway being of appreciable length and adapted for unobstructed flow through the same into said nipple.

7. A fluid pressure reducing means comprising a casing having a fluid pressure inlet, a nozzle positioned centrally and lengthwise in the casing in spaced relation therewith, the inlet of the nozzle being positioned adjacent to one end of the casing, and the casing inlet being at the side and adjacent to the opposite end of the casing, and a discharge pipe connected to the outlet end of the nozzle.

8. A fluid pressure reducing means comprising a casing having a fluid pressure inlet, a nozzle positioned centrally and lengthwise in the casing in spaced relation therewith, the inlet of the nozzle being positioned adjacent to one end of the casing, and the casing inlet being at the side and adjacent to the opposite end of the casing, the end of the casing adjacent to the nozzle inlet having a removable closure, and a discharge pipe connected to the outlet end of the nozzle.

In testimony whereof I have signed my name to this specification.

CHRIS ALLEN.